March 17, 1959 R. CREVELING 2,878,382
PRECISION TIME-DELAY CIRCUIT
Filed March 15, 1956 3 Sheets-Sheet 1

INVENTOR:
Robert Creveling
BY

Attorney

March 17, 1959 R. CREVELING 2,878,382
PRECISION TIME-DELAY CIRCUIT
Filed March 15, 1956 3 Sheets-Sheet 2

INVENTOR:
Robert Creveling
BY
*Roland A. Anderson*
Attorney

March 17, 1959 R. CREVELING 2,878,382
PRECISION TIME-DELAY CIRCUIT
Filed March 15, 1956 3 Sheets-Sheet 3

INVENTOR:
Robert Creveling
BY
Roland A. Anderson
Attorney

United States Patent Office 2,878,382
Patented Mar. 17, 1959

2,878,382
PRECISION TIME-DELAY CIRCUIT

Robert Creveling, Albuquerque, N. Mex., assignor, by mesne assignments, to the United States of America as represented by the United State Atomic Energy Commission Application March 15, 1956, Serial No. 571,844

5 Claims. (Cl. 250—27)

This invention relates generally to time-delay circuits, and more particularly to those time-delay circuits which may produce a delay time of the order of microseconds.

These circuits operate from a voltage pulse, producing a similar pulse separated from the input pulse by the desired delay time. The two pulses may be used to trigger other circuitry requiring a precise time interval between the triggers. It is seen that when the time interval is of the order of microseconds it is quite important that the time delay be repeatable within very close tolerances. The variations in the time delay, observed when a series of input pulses are applied to the circuit, are known as "jitter."

It is an object of this invention to provide a time-delay circuit introducing considerably less jitter into the time delay than do circuits of the prior art.

Various types of time-delay circuits have been used, including the sonic delay line, the artificial transmission line, the R–C delay line, and the phantastron. These all require a large number of components to effect the time delay, resulting in bulkiness and difficulty in trouble-shooting, as well as requiring considerable electrical power. Generally, the cost of such a circuit is in proportion to the number of components.

Another object of this invention is to provide a time-delay circuit needing no external power supply during the delay time.

Still another object of the invention is to provide a time-delay circuit of great simplicity, having the advantages of inexpensiveness, compactness, and ease of trouble-shooting.

Briefly, the present invention includes a capacitor, an inductance and a diode having a finite back resistance, connected serially with the anode of the diode going to ground. At the start of the time delay a negative step-function is applied to the series circuit. A sinusoidal oscillatory signal results, its period determined by the size of the capacitor and of the inductance. During the first half-cycle of oscillation, current flows through the circuit in the direction of easy conduction for the diode. When the current tries to reverse in the second half-cycle, the high back-resistance of the diode prevents reversal. The accumulated energy in the stray capacitance of the inductance then is dissipated in decaying oscillations at a high frequency, determined by the size of the inductance and of the stray capacitance. The sudden rise in voltage at the junction of the diode and the inductance when the oscillations start indicates the end of the time delay and can be used as a trigger voltage.

A better understanding of the invention may be had and other objects and advantages will be apparent by reading the description to follow in conjunction with the attached drawings, in which.

Figure 1:
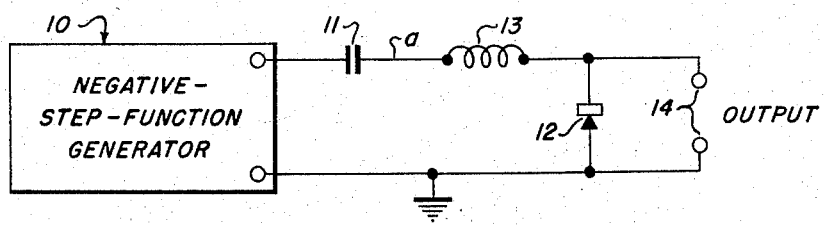
Fig. 1 shows the invention in its simplest form.

Referring now to Fig. 1, negative-step-function generator 10 is any of a number of devices which will normally supply a direct positive or negative voltage to capacitor 11, then on command will suddenly drop the voltage to a more negative value. For example, a high-impedance positive power supply connected to ground by a fast-acting switch would suffice. Immediately after the occurrence of the step function, capacitor 11 begins discharging sinusoidally at a frequency determined by the size of capacitor 11 and of inductance 13. The first half-cycle of the discharge current flows through the circuit consisting of capacitor 11, generator 10, the forward resistance of diode 12, and inductance 13. At the end of the first half-cycle the polarity of the charge in the capacitor has reversed and the current attempts to reverse in a second half-cycle of conduction. But current flow in the opposite direction is opposed by the high back-resistance of diode 12, so the coil energy is dissipated in oscillations at the relatively high resonant frequency of the inductance and its small stray capacitance. These high-frequency oscillations start instantly when the current in the circuit tries to reverse, the voltage at output terminals 14 rising from ground potential to twice the value of the step function, providing a good trigger voltage.

If a particular application of the circuit requires the use of a high-voltage step function such that a semi-conducting diode would be damaged at the start of the high-frequency oscillations, a vacuum diode may be substituted, providing a recharging path is furnished between capacitor 11 and generator 10. Such a path might conveniently consist of a resistor to ground from point a of the circuit, or a resistor across the diode, either of which gives the effect of a finite back-resistance to the diode.

Figure 2:
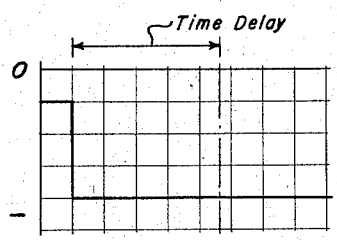
Figs. 2, 3 and 4 are representative voltage waveforms observable at various points in the circuit of Fig. 1.

Fig. 2 shows one possible step-function voltage provided by generator 10. It is shown as going from a negative value to a more negative value, although it will be recognized that the invention is not limited to such values. The requirement, when the circuit of Fig. 1 is used, is only that the voltage step in the negative direction; hence, the term "negative step function."

Figure 3:
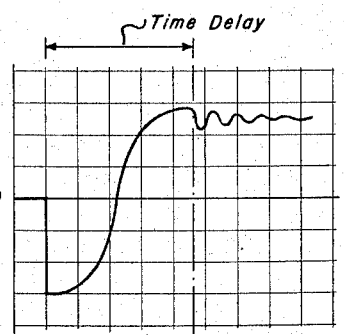

In Fig. 3 the variation in voltage at point a of the circuit of Fig. 1 is shown. Before the occurrence of the step function, point a is held at ground potential by diode 12. The step function causes the voltage to drop suddenly by an amount equal to the step function, and then the voltage rises sinusoidally to a positive value equal to the drop, less circuit losses. The high-frequency oscillations are seen to occur when the peak of the sine wave is reached.

Figure 4:
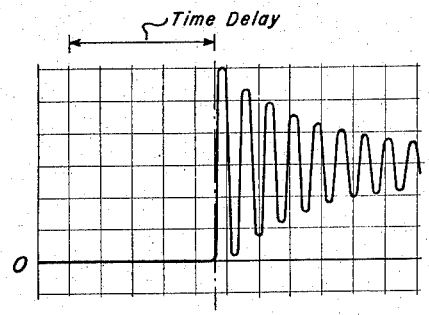

The voltage observed at output terminals 14, as shown by Fig. 4, remains near zero until the high-frequency oscillations begin, at which time it rises suddenly. It is this sudden rise which is used to indicate the end of the delay time. The amplitude of the high-frequency oscillations is seen to decay exponentially with time.

It should be recognized that capacitor 11 and inductance 13 are the principal elements which determine the length of the time delay, in the circuit of Fig. 1 and in the circuits to be described later. Depending upon the electrical values of these elements the time delay may be anything from microseconds to seconds.

Figure 5:
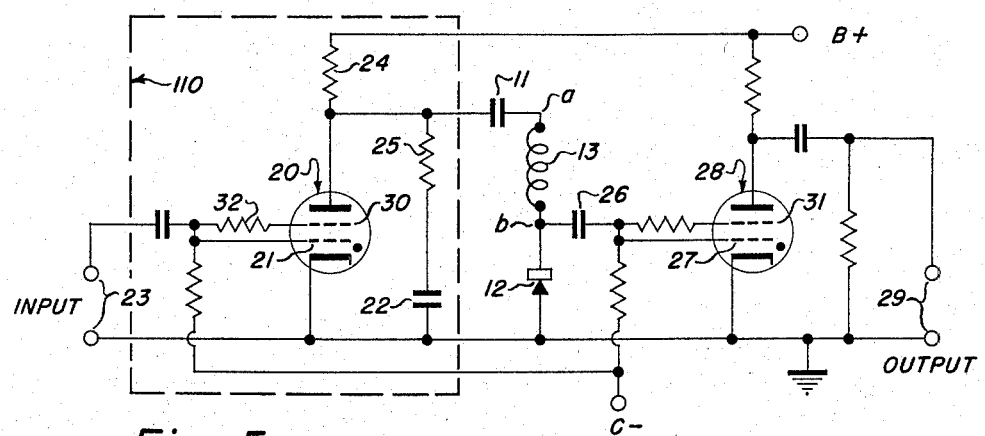
Fig. 5 is a circuit diagram of a preferred embodiment of the invention using hot-cathode thyratrons as switches.
Figure 6:
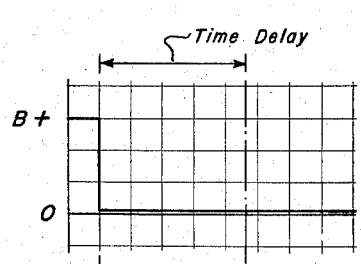
Figs. 6, 7, 8 and 9 represent the voltage waveforms observable at various points in the circuit of Fig. 5.

A more specific embodiment of the invention is shown in Fig. 5. Here, a negative step-function generator 110 includes hot-cathode thyratron 20 and other circuit components necessary to generate the step function. Normally, thyratron 20 is in the nonconducting state, maintained that way by the C— bias on control grid 21. Capacitors 11 and 22 are each charged positively at B+, the plate supply voltage. At the start of the time delay, thyratron 20 is triggered into the conducting state by a positive pulse applied between input terminals 23. The plate of thyratron 20 drops to practically ground potential, as shown in Fig. 6, and B+ appears as a voltage drop across resistor 24. Capacitor 22 then discharges through current-limiting resistor 25 and thyratron 20 to ground in less than a microsecond. The surge of current, which is near the maximum tube rating, creates a large number of ions within the tube so that the subsequent voltage drop from plate to cathode due to the lesser signal current is low and free of noise.

The use of capacitor 22 to create a superabundance of ions within thyratron 20 is claimed and more fully described in a co-pending application of Robert Creveling and Nolan A. Bourgeois, Jr., Serial Number 571,845, filed March 15, 1956, now Patent No. 2,853,610. The supply of ions is necessary to prevent the formation of noise pulses within thyratron 20 during the time delay. It is particularly important that the waveform observed at point $a$ of Fig. 5 be noise-free near its most positive point, since that corresponds to the time of generation of the trigger pulse denoting the end of the time delay. This time-delay circuit is designed to produce a delay of the order of tens of microseconds between input and output pulses. It is seen that the occurrence of a noise pulse near the end of the delay time could easily cause early or late triggering of controlled circuits. Also, the occurrence of noise pulses at any time during the delay time will use some of the energy stored in capacitor 11. Since the extent of the delay time depends upon the available stored energy, an unpredictable number of noise pulses occurring from one time delay to the next will cause an unpredictable variation in the time delay. In the prior art, such noise-caused variations were commonly between 30 and 250 millimicroseconds. The use of the embodiment shown in Fig. 5 yields time delays having variations of less than 3 millimicroseconds.

Figure 7:
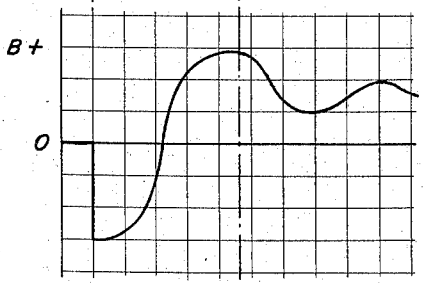

Fig. 7 shows the variations with time of the voltage observed at point $a$ of the circuit of Fig. 5. At the start of the time delay the voltage drops from ground potential to a value of equal but opposite in sign to B+ and then rises sinusoidally to near B+. During this sinusoidal variation in voltage capacitor 11 first discharges, then recharges with opposite polarity through the circuit including thyratron 20, the forward resistance of diode 12, and inductance 13. At the time of the peak of the wave form of Fig. 7 the current attempts to reverse, resulting in the start of high-frequency oscillations.

Figure 8:
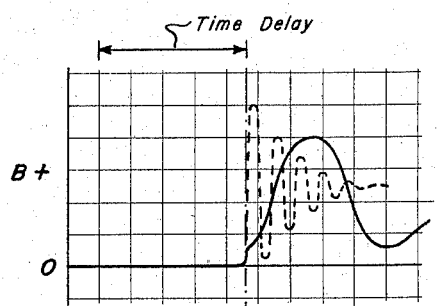
Figure 9:
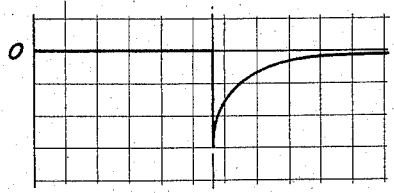

Fig. 8 shows, in broken lines, the high-frequency voltage oscillations which would appear at point $b$ of the circuit of Fig. 5 if capacitor 26 were not connected thereto. The solid-lined waveform of Fig. 8 represents the voltage actually observed at point $b$ with the circuit connected as shown. The voltage is seen to rise from ground potential very steeply, following the broken waveform, until control grid 27 of thyratron 28 is positive enough to fire the thyratron, which has hitherto been biased nonconducting by the C— voltage. The firing of thyratron 28 denotes the end of the time delay and is indicated in Fig. 8 by the inflection in the solid waveform. Fig. 9 shows the negative voltage pulse generated by the thyratron and appearing at output terminals 29. The remaining energy is now dissipated in oscillations within the circuit involving inductance 13, capacitor 11, thyratron 20, thyratron 28 and capacitor 26. The amplitude and frequency of these oscillations are determined by the relative sizes of capacitors 11 and 26. It is desirable that capacitor 26 be near the size of capacitor 11 to lower the peak value of the oscillations, preventing damage to diode 12. Although diode 12 is shown to be a semi-conductor diode, it may be replaced by a vacuum diode shunted by a high resistance, as previously mentioned in connection with Fig. 1.

A conventional R–C coupling circuit is shown in Fig. 5 connecting the plate of thyratron 28 to output terminals 29, facilitating coupling the circuit to other circuitry. The function of thyratron 28 and its associated resistors and capacitors is to furnish a triggering pulse having a more useful shape than that obtainable at point $b$ of the circuit. It will be obvious to one skilled in the art that other pulse-generating means could be used in the place of thyratron 28.

It will be noticed that in Fig. 5, thyratrons 20 and 28 are shown to be of the type having four elements, such as the 2D21, although the invention may instead include a three-element thyratron. Grid 21 is that usually referred to as "grid No. 1" or "control grid," as is grid 27. Grid 30, as well as grid 31, is that usually called "grid No. 2" or "shield grid" and is normally connected to ground or to the cathode. However, in this instance it is used to supplement the triggering of a thyratron. For instance, in thyratron 20, since the triggering voltage acts directly on grid 21, ionization is started therewith, closely followed by further ionization due to the triggering voltage reaching grid 30 by way of resistor 32, which is of the order of a thousand ohms.

Figure 10:
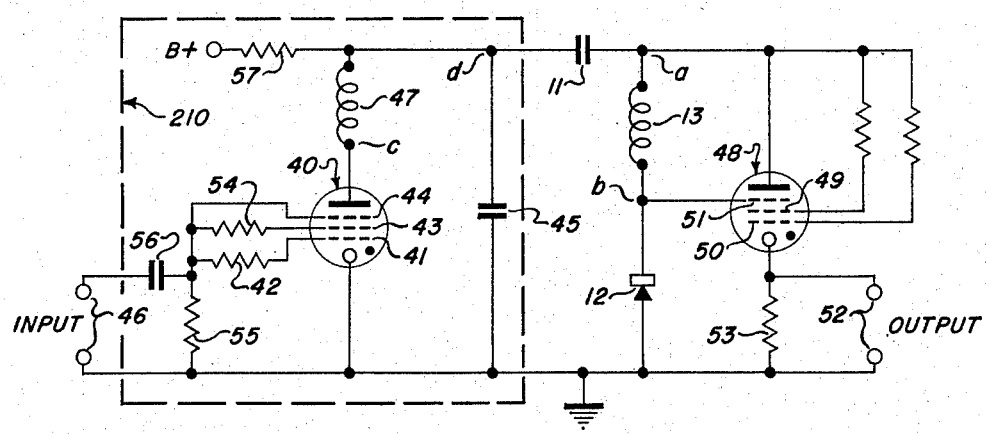
Fig. 10 is a circuit diagram of another specific embodiment of the invention, this embodiment employing cold-cathode thyratrons.

The time-delay circuit which is diagrammed in Fig. 10 uses cold-cathode thyratrons, obviating the necessity of supplying filament power to the circuit. The circuit is specifically designed so that the thyratrons conduct a heavy current for a short period of time, conditions under which cold-cathode thyratrons act as efficient electrical switches. Also, as will be seen from the following description, the B+ voltage supply is needed only to recharge the timing capacitors after a time delay, in preparation for the next timing cycle. Thus, a time-delay circuit is provided which needs no power supply during the delay time. The jitter introduced by this circuit is only about twenty millimicroseconds.

The cold-cathode thyratrons used are the OA5 type, although it will be apparent that other types could be used. In the OA5 thyratron, for example thyratron 40 in Fig. 10, grid 41, which is nearest the cathode, is known as the "keep-alive" grid. It is normally connected to a source of positive voltage through a current-limiting resistor. It is the purpose of this grid to maintain a small volume of ionized gas near the cathode so that the tube will fire reliably when triggered. Grid 43 is a shield grid and is usually left floating to increase the sensitivity of the thyratron. Grid 44 is the control grid and it is to this grid that the trigger pulse is normally applied. It will be noticed that in this circuit, for the purpose of eliminating the need for power between periods of time delay, grid 41 is not used conventionally. Instead, it is connected to receive the triggering pulse, as are grids 43 and 44. Since there is no "keep-alive" action, the triggering pulse must be several hundred volts in amplitude to insure firing of thyratron 40. This pulse should have a fast rise time to insure accurate starting.

In this embodiment of the invention, step-function generator 210 generates the step function in a somewhat different manner than does the circuit of Fig. 5. Before the start of the delay time, both thyratrons are nonconducting and capacitors 11 and 45 are positively charged to the B+ voltage. At the start of the delay time, the positive triggering pulse is applied to input terminals 46 and transmitted to the grids of thyratron 40 by the coupling network of capacitor 56 and resistor 55. Grid 44 receives the pulse directly while grids 41 and 43 receive it through current-limiting resistors 42 and 54 respectively. Thyratron 40 fires, producing a low resistance path to ground from point $c$ of the diagram, causing capacitor 45 to discharge sinusoidally through inductance 47 and thyratron 40. The period of the sinusoid is determined primarily by the values of capacitor 45 and inductance 47, the size of the latter being chosen deliberately small to keep the period short. While thyratron 40 conducts, most of the B+ voltage appears as a voltage drop across resistor 57, which is of the order of megohms. This resistor, as well as its counterpart, resistor 24 in Fig. 5, serves a dual purpose in that it isolates the timing circuit from the power supply during the time delay, preventing the flow of excessive currents from the supply, and it restricts the thyratron current to a value below that needed to maintain ionization so that the thyratron deionizes in preparation for the next timing cycle.

Figure 11:
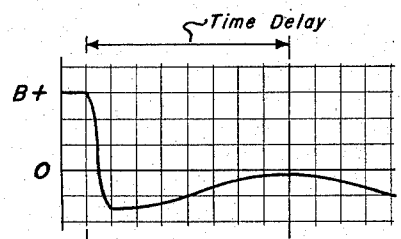
Figs. 11, 12, 13, 14 and 15 depict the voltage waveforms appearing at various points in the circuit of Fig. 10.

Fig. 11 is a sketch of the voltage waveform observed at point $d$ of the circuit. That voltage is seen to drop sinusoidally from B+ to a lesser negative voltage in a very short time corresponding to the time of conduction of thyratron 40, then to remain negative.

Figure 12:
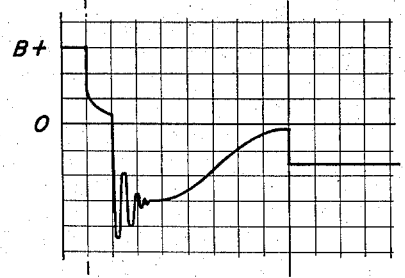

Fig. 12 shows the voltage waveform observed at the plate of thyratron 40, which is point $c$ of the diagram. The plate voltage is seen to drop very suddenly at first, then to trail towards ground potential, and then to drop suddenly to a negative voltage greater than B+. As soon as the plate voltage goes negative, thyratron 40 ceases to conduct and the energy remaining in inductance 47 and its associated stray capacitance is dissipated in decaying oscillations at a high frequency. As shown by Fig. 12, the plate voltage remains negative for the remainder of the delay time, preventing further conduction by thyratron 40.

Figure 13:
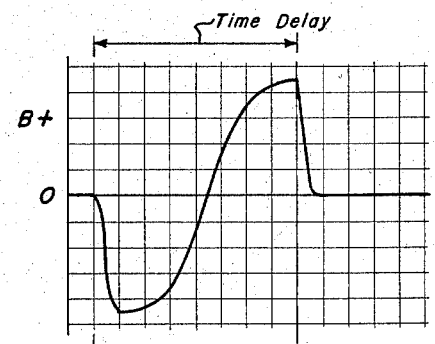

In Fig. 13, the variations in the voltage observed at point $a$ of the diagram are shown. During the time of conduction of thyratron 40, the voltage drops from ground potential to a negative voltage. Since point $a$ is coupled to point $d$ with capacitor 11, the voltage drop is nearly equal to that occurring at point $d$. Then the voltage at point $a$ rises sinusoidally, corresponding to a flow of current through the closed circuit consisting of capacitor 11, diode 12, and inductance 13.

The voltage at point $a$ is applied to the plate of thyratron 48 directly, and to grids 49 and 50 through current-limiting resistances. It will be noticed that grid 49, which is a shield grid, is not left floating in this case, but is used to augment the keep-alive action of grid 50, increasing the assurance that thyratron 48 will fire when triggered.

Figure 14:
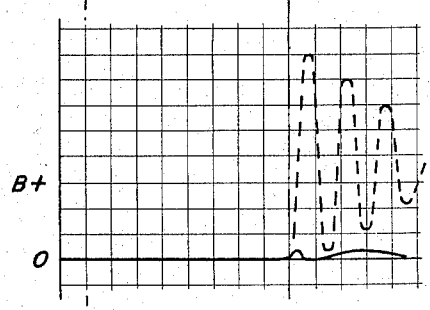

When the voltage at point $a$ reaches its maximum and starts to decrease, reversal of current through the previously mentioned closed circuit is prevented by the high back-resistance of diode 12. The energy stored in inductance 13 and its stray capacitance then starts to dissipate in high-frequency oscillations, the frequency of which is determined by the size of those elements. The voltage of point $b$ in the circuit rises very suddenly from ground potential as shown by the waveform of Fig. 14. The broken waveform is that which the voltage attempts to follow, but the solid waveform shows the actual pulse which triggers control grid 51 of thyratron 48, causing the thyratron to fire. The rise time of this trigger pulse is very short, since the leading edge of the pulse coincides with the abrupt rise of the broken waveform.

Figure 15:
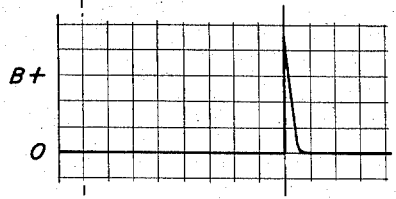

The firing of thyratron 48 denotes the end of the delay time, and a very sharp positive pulse, shown in Fig. 15, appears at output terminals 52. Resistor 53 of Fig. 10 has a value of only a few ohms, thus encouraging a heavy pulse of current to flow through thyratron 48.

The reason why, in this embodiment, negative step-function generator 210 is designed to use thyratron 40 as a switch only during a short portion of the delay time, is that the cold cathode thyratron would add considerable noise to the waveforms if it conducted for a longer period of time, increasing the jitter of the time delay. In order to keep the plate of thyratron 40 below ground potential during the major portion of the delay time, capacitor 45 is chosen to be at least four times greater in value than capacitor 11. Thus, although capacitor 11 is discharging into capacitor 45 during the major portion of the delay time, it never succeeds in raising the plate voltage of thyratron 40 above ground potential and consequently the thyratron does not conduct subsequently during the timing cycle.

A precision time-delay circuit has been described which is capable of producing time delays of the order of microseconds and much longer. The time delays are repeatable to a much greater accuracy than has been heretofore possible. One reason for this is the use of a fast rising transient voltage to define the end of the generated time delay. Another feature of the invention which increases accuracy is the use of an efficient thyratron switch at the beginning of the delay time. Although only one embodiment of the efficient thyratron switch has been described, it will be recognized that other embodiments, which are described in the referenced copending application, could be incorporated in the present invention to obtain further advantages.

It will be recognized that while several specific embodiments of the invention have been shown and described, the invention is not limited thereto. Changes in those embodiments may be made by one skilled in the art without departing from the sphere and scope of the invention as claimed below.

What is claimed is:

1. A precision time-delay circuit comprising: a high-impedance source of positive voltage; an efficient thyratron switch connected from the voltage source to ground; a unidirectional series resonant circuit including a capacitor, an inductor, and a diode having a finite back resistance, connected in parallel with said thyratron switch, the diode being connected with the polarity to permit easy conduction in a closed circuit including said thyratron switch and said resonant circuit when said thyratron is fired; and means for firing said thyratron switch; said time-delay circuit being so constructed and arranged that the firing of said thyratron switch initiates a half-cycle transient oscillatory voltage terminated by a transient oscillatory voltage of substantially higher frequency.

2. A precision time-delay circuit as in claim 1 in which the efficient thyratron switch comprises a thyratron having at least an anode, a cathode and a control grid, the anode being connected to the voltage source and the cathode to ground; means for biasing the control grid to prevent conduction through the thyratron; and means for creating a superabundance of ions within the thyratron.

3. A precision time-delay circuit as in claim 2 in which the means for creating a superabundance of ions within the thyratron comprises a resistor and a capacitor connected serially to ground from the plate of the thyratron.

4. A precision time-delay circuit as in claim 1, wherein the efficient thyratron switch comprises a thyratron having at least an anode, a cathode, and a control grid, the cathode being connected to ground; and means for producing a supply of ions within the thyratron when it fires, including an inductor connected between said voltage source and the anode, and a capacitor connected between said voltage source and ground.

5. A precision time-delay circuit for generating a trigger voltage at a known time after receipt of a signal voltage, comprising: a high-impedance source of positive voltage; a thyratron having at least an anode, a cathode, and a control grid, the cathode being connected to ground; a first inductor connected between said voltage source and the anode; a first capacitor connected between said voltage source and ground; a unidirectional series resonant circuit including a second capacitor, a second inductor, and a diode having a finite back resistance, connected between said voltage source and the cathode of the thyratron, the diode being connected with a polarity to permit easy conduction in a closed circuit including the thyratron, the first inductor and said resonant circuit when the thyratron is fired, said resonant circuit having a first natural resonant period equal to twice the desired delay time, and the second inductor in combination with its inherent stray capacitance having a second natural resonant period which is short compared to said first period; means for biasing the control grid to prevent conduction through the thyratron; and means responsive to the signal voltage for overcoming the bias and firing the thyratron; said time-delay circuit being so constructed and arranged that the firing of the thyratron initiates a half-cycle transient oscillatory voltage having said first period and generated by said resonant circuit, said voltage being terminated by the trigger voltage having said second period and generated by the second inductor and its stray capacitance.

References Cited in the file of this patent

UNITED STATES PATENTS

| | | |
|---|---|---|
| 2,414,541 | Madsen | Jan. 21, 1947 |
| 2,511,595 | Loughren | June 13, 1950 |
| 2,543,445 | Doolittle | Feb. 27, 1951 |
| 2,631,232 | Baracket | Mar. 10, 1953 |
| 2,710,351 | Lebacqz | June 7, 1955 |
| 2,739,233 | Clayton | Mar. 20, 1956 |
| 2,743,367 | Felch et al. | Apr. 24, 1956 |